United States Patent
Simon

(10) Patent No.: US 11,231,129 B2
(45) Date of Patent: Jan. 25, 2022

(54) FIRE PROTECTION DEVICE AND FIRE PROTECTION ASSEMBLY

(71) Applicant: Hilti Aktiengesellschaft, Schaan (LI)

(72) Inventor: Sebastian Simon, Buchloe Lindenberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/733,405

(22) PCT Filed: Mar. 14, 2019

(86) PCT No.: PCT/EP2019/056417
§ 371 (c)(1),
(2) Date: Jul. 22, 2020

(87) PCT Pub. No.: WO2019/179873
PCT Pub. Date: Sep. 26, 2019

(65) Prior Publication Data
US 2020/0347965 A1    Nov. 5, 2020

(30) Foreign Application Priority Data

Mar. 21, 2018   (EP) .................................. 18163071

(51) Int. Cl.
*F16L 5/04*    (2006.01)
*A62C 2/06*    (2006.01)

(52) U.S. Cl.
CPC ............... *F16L 5/04* (2013.01); *A62C 2/065* (2013.01)

(58) Field of Classification Search
CPC .. A62C 2/065; A62C 3/16; F16L 5/04; H02G 3/0412
See application file for complete search history.

(56) References Cited

U.S. PATENT DOCUMENTS

| | | | | |
|---|---|---|---|---|
| 5,452,551 A | * | 9/1995 | Charland | ............... A62C 2/065 52/1 |
| 5,548,934 A | * | 8/1996 | Israelson | ............... A62C 2/065 52/1 |
| 7,797,893 B2 | * | 9/2010 | Stahl, Sr. | .................. F16L 5/04 52/220.8 |
| 10,415,725 B2 | | 9/2019 | Muenzenberger | |

(Continued)

FOREIGN PATENT DOCUMENTS

| | | |
|---|---|---|
| DE | 94 11 293 U1 | 9/1994 |
| EP | 3 088 783 | 11/2016 |

(Continued)

OTHER PUBLICATIONS

International Search Report dated Apr. 5, 2019 in PCT/EP2019/056417 with English translation, 5 pages.

(Continued)

*Primary Examiner* — Adriana Figueroa
(74) *Attorney, Agent, or Firm* — Grüneberg and Myers PLLC

(57) ABSTRACT

A fire protection device is useful for sealing through-openings in wall or ceiling elements made of wood or a similar material, in particular for sealing line or pipe feed-throughs. The fire protection device has a main body and at least one expansion body which is attached to an end face of the main body and contains an intumescent material. Also useful is a fire protection assembly.

15 Claims, 2 Drawing Sheets

(56) References Cited

U.S. PATENT DOCUMENTS

| | | |
|---|---|---|
| 10,641,417 B2 | 5/2020 | Muenzenberger |
| 10,662,644 B2 * | 5/2020 | Hulteen ................. E04B 1/948 |
| 2004/0168398 A1 * | 9/2004 | Sakno ....................... F16L 5/04 |
| | | 52/741.4 |
| 2018/0112803 A1 | 4/2018 | Muenzenberger |
| 2019/0195395 A1 | 6/2019 | Muenzenberger |
| 2020/0056073 A1 * | 2/2020 | Hulteen .................... C09J 5/00 |
| 2020/0224799 A1 | 7/2020 | Muenzenberger |

FOREIGN PATENT DOCUMENTS

| | | | |
|---|---|---|---|
| FR | 2370139 A2 * | 6/1978 | ............... F16L 5/04 |
| JP | 2017-172748 | 9/2017 | |
| WO | WO-9119127 A2 * | 12/1991 | ............. A62C 2/065 |

OTHER PUBLICATIONS

Written Opinion dated Apr. 5, 2019 in PCT/EP2019/056417 with English translation, 9 pages.

* cited by examiner

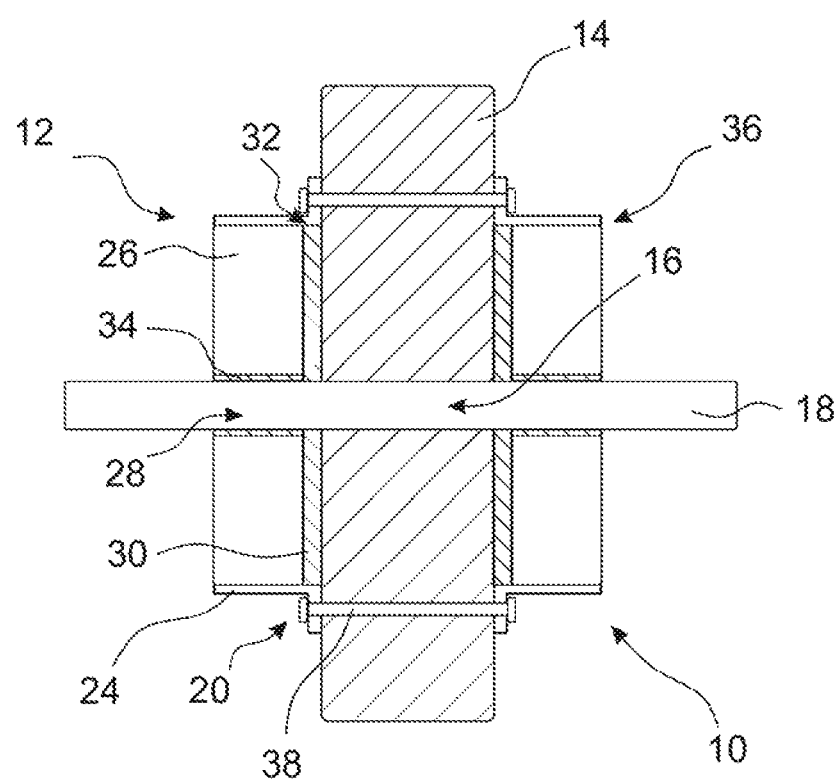

FIRE PROTECTION DEVICE AND FIRE PROTECTION ASSEMBLY

CROSS-REFERENCE TO RELATED APPLICATIONS

This application is a National Stage entry under § 371 of International Application No. PCT/EP2019/056417 filed on Mar. 14, 2019, which claims the benefit of European Application No. 18163071.6, filed on Mar. 21, 2018, the content of each of which is hereby incorporated by reference in its entirety.

BACKGROUND OF THE INVENTION

Field of the Invention

The invention relates to a fire protection device for sealing through-openings in wall or ceiling elements made of wood or a similar material, in particular for sealing line or pipe feedthroughs, and to a fire protection assembly.

Description of Related Art

Various fire protection devices (e.g. fire protection collars) for closing through-openings in ceilings or walls in the event of a fire are known from the prior art. These fire protection devices usually have an intumescent material arranged around lines or pipes which extend through the through-openings. In the event of a fire, the intumescent material closes the through-openings and thus prevents fire and/or smoke from spreading through the through-opening.

If, however, the corresponding ceiling or wall is made from wood or a similar, combustible material, the known fire protection devices ensure only reduced fire protection times, since, as a result of the material of the ceiling or wall burning, a gap is created via which fire and/or smoke can spread through the through-opening.

BRIEF SUMMARY OF THE INVENTION

The problem addressed by the finding is therefore that of providing a fire protection device for sealing through-openings and a fire protection assembly which ensure optimum fire protection times in the case of flammable ceilings or walls.

BRIEF DESCRIPTION OF THE SEVERAL VIEWS OF THE DRAWINGS

FIG. 3 shows a fire protection assembly according to the invention in an alternative variant.

DETAILED DESCRIPTION OF THE INVENTION

Figure 1:
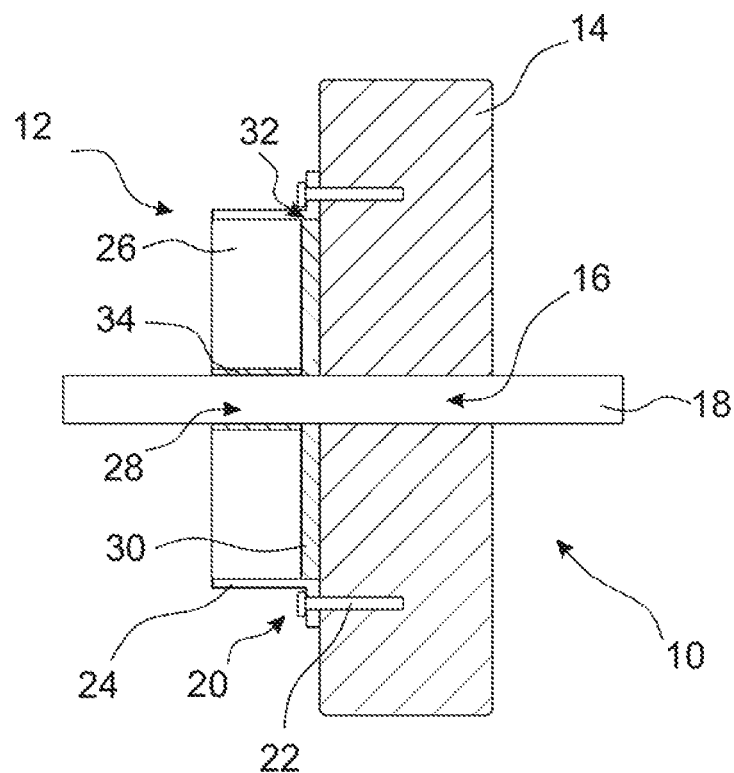
FIG. 1 shows a longitudinal section through a fire protection assembly according to the invention.

The problem is solved according to the invention by a fire protection device of the type mentioned at the outset which comprises a main body and at least one expansion body which is attached to an end face of the main body and contains an intumescent material. In the event of a fire, the expansion body expands and thus compensates for any loss of material from the wall or ceiling element caused by burning. In the event of a fire, the through-opening is therefore securely closed, in particular in a smokeproof manner, despite the combustible material through which the through-opening extends. In addition, the intumescent material reduces heat transfer, and therefore the temperature on a side of the wall or ceiling element that is opposite the fire protection device remains below a critical temperature (ignition temperature) for longer. This significantly improves the fire protection time and effectively prevents smoke from spreading.

The improved fire protection time was demonstrated in a fire protection test in accordance with DIN EN 1366, following a standard temperature-time curve (ETK). The test was carried out for a metal flange attached to a through-opening with a fire protection device known from the prior art and with a fire protection device according to the invention, the corresponding wall element being made of wood. The results of the two fire protection tests are summarized in the following table:

| Fire test time [min] | Fire protection device from the prior art | Fire protection device according to the invention |
|---|---|---|
| 1 | start of the fire protection test | start of the fire protection test |
| 5 | wooden surface ignites | wooden surface ignites |
| 14 | wooden surface starts to burn | wooden surface starts to burn |
| 22 | burning visible under metal flange | expansion body visibly expands |
| 25 | | intumescent material swells out to the side of the metal flange |
| 29 | | a block of cinders forms around the metal flange |
| 30 | burning under metal flange creates gap | gap between metal flange and wood closed by the intumescent material |
| 42 | | parts of the intumescent material fall off on the side nearer the fire |
| 60 | | intumescent material around the metal flange is still compact |
| 80 | light smoke emerges on the side of the through-opening further away from the fire | no smoke emerges on the side of the through-opening nearer the fire |
| 88 | | light smoke emerges on the side of the through-opening further away from the fire |
| 90 | end of test | end of test |

These results clearly show that the fire protection time is improved by the fire protection device according to the invention. In this particular case, smoke was prevented from spreading on the side further away from the fire for eight minutes longer.

According to one embodiment of the invention, the main body is of a substantially cylindrical shape. Cylindrical can mean both circular cylindrical and cylindrical in the general mathematical sense. In particular, the shape of the main body is adapted to the shape of the through-opening.

The main body preferably has a through-opening. This is, for example, circular cylindrical or cylindrical in the general mathematical sense. In particular, the through-opening is designed to accommodate cables and/or pipes.

A further expansion body is also preferably provided on an inner and/or outer face of the main body. In particular, the further expansion body contains an intumescent material. The further expansion body is provided, for example, on a wall of the main body which defines a through-opening through the main body. In the event of a fire, the further expansion body expands and reliably closes the through-opening, even if lines and/or pipes guided through the main body are not fire-resistant. In this context, not fire-resistant is to be understood to mean that the lines or pipes burn or deform at temperatures that prevail during a fire.

According to one aspect, the expansion body extends in an outer region of the end face. If the main body has a through-opening, the expansion body extends in particular in a region which, when viewed in the axial direction of the main body, lies radially between the through-opening and an outer face of the main body. In particular, the expansion body completely surrounds the through-opening in the circumferential direction (but can be offset from the through-opening in the axial direction). This prevents the ingress of smoke particularly effectively and further reduces heat transfer.

According to a further aspect, the expansion body contains expandable graphite. In other words, the intumescent material comprises expandable graphite or is made from expandable graphite. Expandable graphite has properties that are particularly suitable for fire protection purposes (in particular volume increase and thermal conductivity).

A wall of the expansion body can be made from an acrylate-based material.

The intumescent material is preferably applied to a carrier material, which in particular comprises a fabric material comprising glass fibers or another fire-resistant material. The intumescent material can easily be attached to the main body by means of the carrier material.

According to another aspect, the expansion body and the intumescent material are designed in such a way that, in the event of a fire, the expansion body at least compensates, in particular overcompensates, for burning of the wall or ceiling element. The expansion body can therefore contain more intumescent material than would be necessary to close the through-opening in the event of a fire. In particular, in the event of a fire, the additional intumescent material expands radially beyond the through-opening, when viewed in the axial direction of the through-opening. The additional intumescent material thus forms a kind of protective ring, which can reduce heat transfer to the wall or ceiling element and thus delay burning of the wall or ceiling element.

The problem is also solved according to the invention by a fire protection assembly comprising a wall or ceiling element made of wood or a similar material, which has a through-opening, in particular a line feedthrough or preliminary passage, and at least one fire protection device according to the invention, the fire protection device being attached to the wall or ceiling element in the region of the through-opening. With regard to the advantages, reference is made to the above explanations.

According to one aspect, a further fire protection device according to the invention is attached to the wall or ceiling element on a side that is opposite the first fire protection device. In this way, irrespective of the location of a fire, the through-opening is securely closed and a long fire protection time is ensured.

The at least one fire protection device is preferably attached to the wall or ceiling element in such a way that the expansion body rests directly against the wall or ceiling element. As a result, the through-opening is securely closed at the start of a fire.

Figure 2:
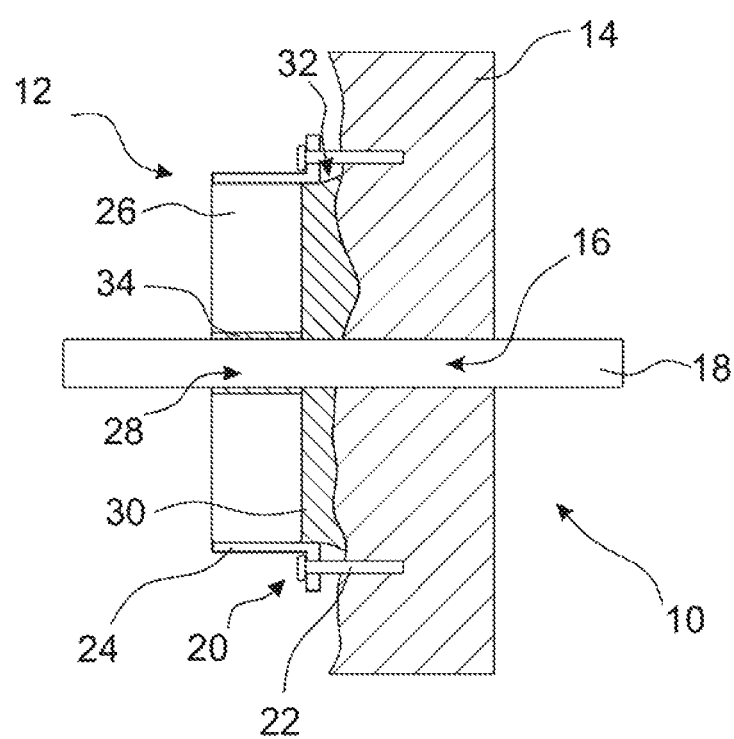
FIG. 2 shows the fire protection assembly from FIG. 1 in the event of a fire.

Further advantages and properties of the invention can be found in the following description and the drawings to which reference is made. In the drawings:

FIG. 1 is a longitudinal section through a fire protection assembly according to the invention;

FIG. 2 shows the fire protection assembly from FIG. 1 in the event of a fire; and FIG. 3 shows a fire protection assembly according to the invention in an alternative variant.

FIG. 1 shows a fire protection assembly 10 comprising a fire protection device 12 and a wall or ceiling element 14.

In general terms, fire protection devices 12 of this type are used to close through-openings in wall or ceiling elements or to keep said openings closed in the event of a fire, in order to prevent or at least delay the spread of smoke and/or fire through the through-opening.

The wall or ceiling element 14 consists of wood or a similar, combustible material. Said element has a through-opening 16 through which a pipe 18 is guided. Alternatively or additionally, at least one cable can also be guided through the through-opening 16, for example a cable comprising an electrical conductor.

The fire protection device 12 is attached to the wall or ceiling element 14 by fastening means 20 in the region of the through-opening 16. The fastening means 20 are, for example, screws 22 which are screwed into the wall or ceiling element 14 through a flange 24 of the fire protection device 12. The fire protection device 12 can, however, also be attached to the wall or ceiling element 14 in any other suitable manner.

The fire protection device 12 comprises a main body 26 having a through-opening 28 through which the pipe 18 is guided. The main body 26 and/or the through-opening 28 is in particular of a shape that is substantially circular cylindrical or cylindrical in the general mathematical sense.

An expansion body 30 which contains an intumescent material is attached to a front face of the main body 26 that faces the wall or ceiling element 14.

The intumescent material is, in particular, expandable graphite, which can be applied to a carrier material. The carrier material is preferably made from a fire-resistant material of a large surface area, for example from glass fibers. Fire-resistant is to be understood here to mean that the carrier material does not burn or undergo a significant change in shape at temperatures that prevail during a fire.

Furthermore, the expansion body 30 can have a wall 32 made of an acrylate-based material. The wall 32 is made in particular from an expandable material. Said wall can surround the expansion body 30 completely or at least partially.

When viewed in the axial direction A, the expansion body 30 extends radially between the through-opening 28 and an outer face of the main body 26. The expansion body 30 preferably rests directly against the wall or ceiling element 14.

In addition, a further expansion body 34 comprising an intumescent material can be provided on a wall of the main body 26 that defines the through-opening 28. This is preferably the case if the pipe 18 is not made from a fire-resistant material. The further expansion body 34 can extend in an outer region of the end face (40).

The operating principle of the fire protection device 12 is described in more detail below with reference to FIG. 2, which shows the fire protection assembly 10 in the event of a fire.

In the event of a fire, there is loss of material from the wall or ceiling element 14 due to burning, which could result in the spread of fire and/or smoke through the through-opening 16.

With exposure to heat brought about by the fire, however, the expansion body 30 expands, driven by the intumescent material, and thus compensates for the loss of material from the wall or ceiling element 14 caused by the burning.

In particular, the expansion body 30 and the intumescent material are designed in such a way that, in the event of a fire, the expansion body 30 overcompensates for burning of the wall or ceiling element 14. The expansion body 30 can therefore contain more intumescent material than would be necessary to close the through-opening 14 in the event of a fire.

Accordingly, fire and/or smoke cannot spread through the through-opening 16, as a result of which a fire protection time of the fire protection assembly 10 is significantly increased. In addition, heat transfer through the through-opening 16 is also reduced, since the intumescent material preferably has a low coefficient of thermal conductivity.

If the pipe 18 is not made from a fire-resistant material, the further expansion body 34 also compensates for deformation caused by exposure to heat and/or burning of the pipe 18 and thus closes the through-opening 28.

FIG. 3 shows a further variant of a fire protection assembly 10, in which a second fire protection device 36 is attached to a side of the wall or ceiling element 14 that is opposite the first fire protection device 12.

The second fire protection device 36 can be designed analogously to the first fire protection device 12.

In the variant shown in FIG. 3, the two fire protection devices 12, 36 have common fastening means 20. These fastening means are, for example, threaded screws that extend through the wall or ceiling element 14 and corresponding nuts.

Alternatively, the two fire protection devices 12, 36 can, however, also be attached, for example screwed, to the wall or ceiling element 14 independently of one another.

The invention claimed is:

1. A fire protection device for sealing a through-opening in a wall or ceiling element made of wood or a combustible material, the fire protection device comprising:
   a main body, wherein the main body has a length that extends parallel to the wall or ceiling or element, and
   a frame, wherein the frame fastens the fire protection device to the wall or ceiling element,
   prior to a fire, at least one expansion body is attached directly to an end face of the main body along the length and configured to be placed only between the end face of the main body and the wall or ceiling element, and wherein the at least one expansion body contains an intumescent material and extends only under the main body.

2. The fire protection device according to claim 1, wherein the main body is of a substantially cylindrical shape.

3. The fire protection device according to claim 1, wherein the main body has a through-opening.

4. The fire protection device according to claim 1, wherein at least one further expansion body is provided on an inner and/or outer face of the main body.

5. The fire protection device according to claim 4, wherein the at least one further expansion body is configured to extend to an outer region of the end face in the event of a fire.

6. The fire protection device according to claim 4, wherein the at least one further expansion body contains expandable graphite.

7. The fire protection device according to claim 1, wherein the intumescent material is applied to a carrier material.

8. The fire protection device according to claim 1, wherein the at least one expansion body and the intumescent material are designed in such a way that, in an event of a fire, the at least one expansion body at least compensates for burning of the wall or ceiling element.

9. A fire protection assembly, comprising:
   a wall or ceiling element made of wood or a combustible material, which has a through-opening, and
   at least one fire protection device according to claim 1, the at least one fire protection device being attached to the wall or ceiling element in a region of the through-opening.

10. The fire protection assembly according to claim 9, wherein a further fire protection device is attached to the wall or ceiling element on a side that is opposite the at least one fire protection device.

11. The fire protection assembly according to claim 9, wherein the at least one fire protection device is attached to the wall or ceiling element in such a way that the at least one expansion body rests directly against the wall or ceiling element.

12. The fire protection device according to claim 1, wherein the fire protection device is for sealing a line or pipe feedthrough.

13. The fire protection device according to claim 8, wherein the at least one expansion body at least overcompensates for burning of the wall or ceiling element.

14. The fire protection assembly according to claim 9, wherein the through-opening is a line or pipe feedthrough.

15. The fire protection device according to claim 1, wherein the at least one expansion body covers an entirety of the end face of the main body.

* * * * *